United States Patent
Wang et al.

(10) Patent No.: US 12,236,901 B2
(45) Date of Patent: Feb. 25, 2025

(54) BRIGHTNESS CONTROL APPARATUS AND METHOD, AND DISPLAY APPARATUS

(71) Applicant: BOE Technology Group Co., Ltd., Beijing (CN)

(72) Inventors: Xinle Wang, Beijing (CN); Wenchao Han, Beijing (CN); Yifan Song, Beijing (CN); Zhaohui Meng, Beijing (CN); Lianghao Zhang, Beijing (CN); Yilin Feng, Beijing (CN); Zhengri Lin, Beijing (CN); Mingming Wang, Beijing (CN); Wei Sun, Beijing (CN); Rui Liu, Beijing (CN); Xin Duan, Beijing (CN); Jing Liu, Beijing (CN); Wanzhi Chen, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/769,766

(22) PCT Filed: May 28, 2021

(86) PCT No.: PCT/CN2021/096922
§ 371 (c)(1),
(2) Date: Apr. 18, 2022

(87) PCT Pub. No.: WO2022/246832
PCT Pub. Date: Dec. 1, 2022

(65) Prior Publication Data
US 2024/0304155 A1    Sep. 12, 2024

(51) Int. Cl.
*G09G 3/34* (2006.01)
*G02F 1/1335* (2006.01)
(Continued)

(52) U.S. Cl.
CPC ..... *G09G 3/3406* (2013.01); *G02F 1/133612* (2021.01); *G09G 3/36* (2013.01);
(Continued)

(58) Field of Classification Search
CPC .... G06V 40/13; G09G 3/0412; G09G 3/0416; G09G 3/32; G09G 3/36; G09G 3/3406;
(Continued)

(56) References Cited

U.S. PATENT DOCUMENTS

| | | | |
|---|---|---|---|
| 10,412,813 B1 * | 9/2019 | Chen | .......... H05B 47/105 |
| 2007/0023614 A1 | 2/2007 | Park et al. | |
| 2008/0198151 A1 | 8/2008 | Lee et al. | |
| 2010/0110096 A1 * | 5/2010 | Satoh | .......... G02F 1/136209 345/589 |

(Continued)

FOREIGN PATENT DOCUMENTS

| | | |
|---|---|---|
| CN | 101153967 A | 4/2008 |
| CN | 101246675 A | 8/2008 |

(Continued)

*Primary Examiner* — Chanh D Nguyen
*Assistant Examiner* — Nguyen H Truong
(74) *Attorney, Agent, or Firm* — Ling Wu; Stephen Yang; Ling and Yang Intellectual Property

(57) ABSTRACT

Disclosed are a brightness control apparatus and method, and a display apparatus. The brightness control apparatus includes an optical detection circuit and an integrated circuit chip connected with the optical detection circuit. The optical detection circuit includes at least one transistor, configured to detect a light intensity of light to be detected corresponding to an environment where a display panel is located, and generate an electrical signal corresponding to the light intensity of the light to be detected.

18 Claims, 6 Drawing Sheets

(51) Int. Cl.
*G09G 3/36* (2006.01)
*G06F 3/041* (2006.01)

(52) U.S. Cl.
CPC .......... *G06F 3/0412* (2013.01); *G06F 3/0416* (2013.01); *G09G 2320/0626* (2013.01); *G09G 2354/00* (2013.01); *G09G 2360/144* (2013.01); *G09G 2370/10* (2013.01)

(58) Field of Classification Search
CPC .. G09G 5/00; G09G 5/02; G09G 5/10; G09G 2320/0626; G09G 2354/00; G09G 2360/144; G09G 2370/10; G02F 1/133; G02F 1/1335; G02F 1/13357; G02F 1/133612; H05B 33/00; H05B 37/02; G01J 1/16; G01J 1/42; G01J 1/44; G01J 1/46; G01J 1/4204; G06F 3/038
See application file for complete search history.

(56) References Cited

U.S. PATENT DOCUMENTS

| | | | |
|---|---|---|---|
| 2011/0148834 A1* | 6/2011 | Baek | G09G 3/3406 |
| | | | 345/207 |
| 2011/0248973 A1 | 10/2011 | Kuhlman et al. | |
| 2020/0167581 A1* | 5/2020 | Zhang | G06V 40/193 |
| 2022/0171494 A1* | 6/2022 | Shih | G06F 3/04184 |
| 2023/0062373 A1* | 3/2023 | Ono | H04N 9/3194 |
| 2024/0029627 A1* | 1/2024 | Li | G09G 3/32 |

FOREIGN PATENT DOCUMENTS

| | | |
|---|---|---|
| CN | 102645274 A | 8/2012 |
| CN | 104486889 A | 4/2015 |
| CN | 209070955 U | 7/2019 |
| CN | 110780502 A | 2/2020 |
| CN | 111445869 A | 7/2020 |
| JP | 2002-297096 A | 10/2002 |

* cited by examiner

BRIGHTNESS CONTROL APPARATUS AND METHOD, AND DISPLAY APPARATUS

CROSS-REFERENCE TO RELATED APPLICATION

This application is a national stage application of PCT Application No. PCT/CN2021/096922, which is filed on May 28, 2021 and entitled "Brightness Control Apparatus and Method, and Display Apparatus", the content of which is incorporated herein by reference in its entirety.

TECHNICAL FIELD

Embodiments of the present disclosure relate to, but are not limited to, the field of display technologies, and particularly to a brightness control apparatus and method, and a display apparatus.

BACKGROUND

With the extensive application of Liquid Crystal Display (LCD) display panels, more and more electronic devices with LCD display panels will be equipped with optical sensors (also referred to as light sensors), so as to adjust brightness of the LCD display panels according to brightness of light in environments where the electronic devices are located to bring better visual experiences to users at the same time of saving power consumption.

However, an optical sensor is usually relatively high in cost and mutually independent of an LCD display panel, which results in relatively high cost of an electronic device and is unfavorable for achievement of a full screen of the electronic device.

SUMMARY

The following is a summary about subject matters described in the present disclosure in detail. The summary is not intended to limit a scope of protection of claims.

In one aspect, an embodiment of the present disclosure provides a brightness control apparatus, applied to a display panel. The brightness control apparatus includes an optical detection circuit and an integrated circuit chip connected with the optical detection circuit. The optical detection circuit includes at least one transistor, configured to detect a light intensity of light to be detected corresponding to an environment where the display panel is located, and generate an electrical signal corresponding to the light intensity of the light to be detected. The integrated circuit chip is configured to generate a brightness detection value of the light to be detected based on the electrical signal corresponding to the light intensity of the light to be detected, and adjust display brightness of the display panel according to the brightness detection value of the light to be detected.

In another aspect, an embodiment of the present disclosure also provides a display apparatus, including a display panel and the above-mentioned brightness control apparatus.

The display panel includes: a display region, and a bonding region and a border region that are located on two opposite sides of the display region in a first direction.

An optical detection circuit in the brightness control apparatus is arranged in the border region, and an integrated circuit chip in the brightness control apparatus is in a bonding connection with the bonding region.

In yet another aspect, an embodiment of the present disclosure also provides a brightness control method, applied to the above-mentioned brightness control apparatus. The brightness control method includes: detecting a light intensity of light to be detected corresponding to an environment where a display panel is located, and generating an electrical signal corresponding to the light intensity of the light to be detected; and generating a brightness detection value of the light to be detected based on the electrical signal corresponding to the light intensity of the light to be detected, and adjusting display brightness of the display panel according to the brightness detection value of the light to be detected.

Other characteristics and advantages of the present disclosure will be elaborated in the following specification, and moreover, partially become apparent from the specification or are understood by implementing the present disclosure. Other advantages of the present disclosure may be achieved and obtained through solutions described in the specification and the drawings.

Other aspects will become apparent upon reading and understanding the drawings and detailed description.

BRIEF DESCRIPTION OF DRAWINGS

The drawings are used for providing understanding of technical solutions of the present disclosure, constitute a part of the specification, and together with the embodiments of the present disclosure, are used for explaining the technical solutions of the present disclosure but not to form limitations on the technical solutions of the present disclosure. Shapes and sizes of each component in the drawings do not reflect actual scales, and are only intended to schematically illustrate contents of the present disclosure.

DETAILED DESCRIPTION

Figure 1:
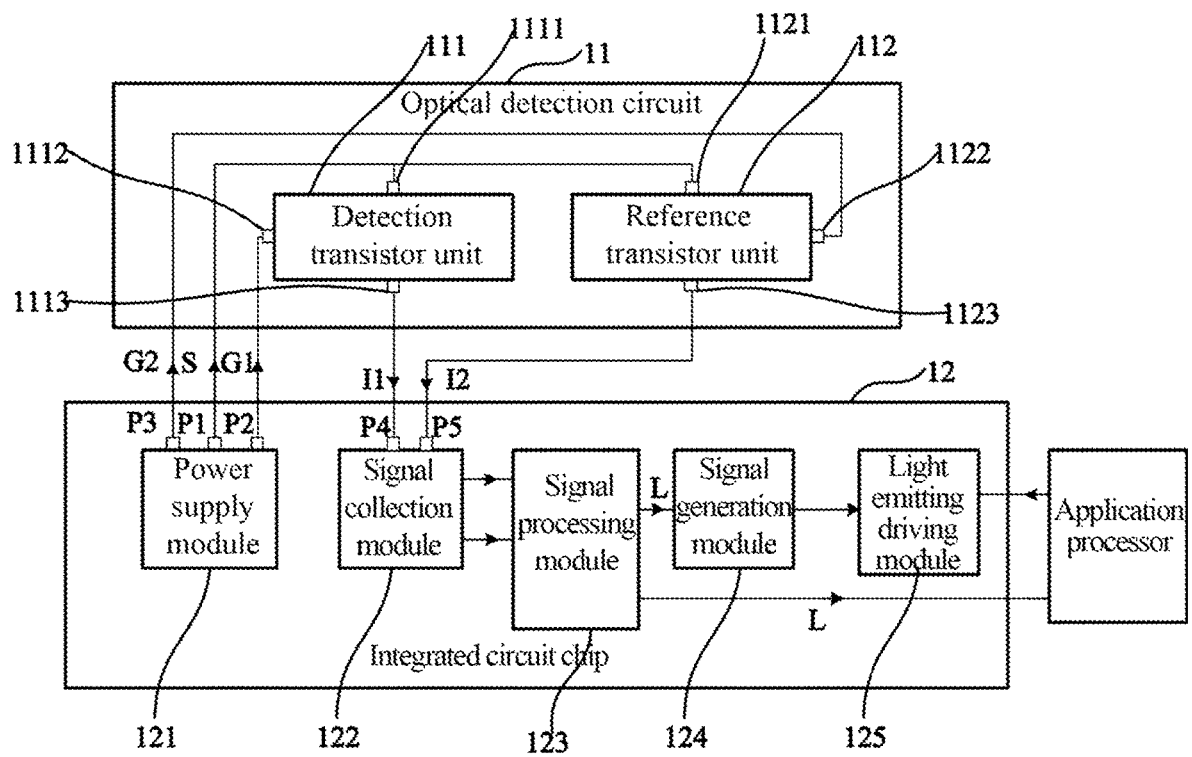
FIG. 1 is a schematic diagram of a structure of a brightness control apparatus in an exemplary embodiment of the present disclosure.

Multiple embodiments are described in the present disclosure. However, the description is exemplary and unrestrictive, and more embodiments and implementation solutions are possible within a scope contained in the embodiments described herein. Although many possible feature combinations are shown in the drawings and discussed in exemplary implementation modes, many other combinations of the disclosed features are also possible. Unless specifically restricted, any feature or element in any embodiment may be combined with any other feature or element in any other embodiment for use, or may substituted for any other feature or element in any other embodiment.

When a representative embodiment is described, a method or process may already be presented in a specific sequence of acts in the specification. However, to an extent that the method or process does not depend on a specific sequence of the acts herein, the method or process should not be limited to the acts in the specific sequence. As understood by those of ordinary skill in the art, other sequences of the acts are possible. Therefore, a specific sequence of acts described in the specification should not be explained as a limitation to the claims. In addition, execution of the acts of a method or process in the claims directed to the method or process should not be limited to the sequence written, and it may be readily understood by those skilled in the art that the sequence may be varied and still remain within the spirit and scope of the embodiments of the present disclosure.

In the drawings, a size of each constituent element, a thickness of a layer, or a region is exaggerated sometimes for clarity. Therefore, one implementation mode of the present disclosure is not necessarily limited to the size, and shapes and sizes of various components in the drawings do not reflect actual scales. In addition, the drawings schematically illustrate ideal examples, and one implementation mode of the present disclosure is not limited to the shapes, numerical values, or the like shown in the drawings.

Ordinal numerals "first", "second", "third", etc., in the specification are set not to form limits in number but only to avoid confusion of constituent elements.

In the specification, for convenience, expressions indicating directional or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element has a particular orientation and is structured and operated in the particular orientation. Therefore, they cannot be understood as limitations on the present disclosure. The positional relationships between the constituent elements may be changed as appropriate according to a direction according to which each constituent element is described. Therefore, appropriate replacements may be made according to situations without being limited to the expressions described in the specification.

In the specification, unless otherwise specified and defined explicitly, terms "mount", "mutually connect", and "connect" should be understood in a broad sense. For example, it may be a fixed connection, or a detachable connection, or an integrated connection. It may be a mechanical connection or an electrical connection. It may be a direct mutual connection, or an indirect connection through middleware, or internal communication between two elements. Those of ordinary skill in the art may understand meanings of the above-mentioned terms in the present disclosure according to situations.

In the specification, an "electrical connection" includes a case that constituent elements are connected together through an element with some electrical function. The "element with some electrical function" is not particularly limited as long as electrical signals may be sent and received between the connected constituent elements. The "element with some electrical function" may be, for example, an electrode or wiring, or a switching element such as a transistor, or another functional element such as a resistor, a reactor, or a capacitor.

In the specification, a transistor refers to an element that at least includes three terminals, i.e., a gate electrode (gate or control electrode), a drain electrode (drain electrode terminal, drain region, or drain), and a source electrode (source electrode terminal, source region, or source). A transistor has a channel region between a drain electrode and a source electrode, and a current can flow through the drain electrode, the channel region, and the source electrode. It is to be noted that, in the specification, the channel region refers to a region that the current mainly flows through.

In the specification, in order to distinguish two electrodes of a transistor other than a gate electrode (gate electrode or control electrode), one of the two electrodes is directly described as a first electrode, while the other is described as a second electrode. The first electrode may be a drain electrode, and a second electrode may be a source electrode. Or, the first electrode may be a source electrode, and the second electrode may be a drain electrode. In a case that transistors with opposite polarities are used, or a direction of a current changes during work of a circuit, or the like, functions of the "source electrode" and the "drain electrode" are sometimes interchangeable. Therefore, the "source electrode" and the "drain electrode" are interchangeable in the specification.

Transistors in the embodiments of the present disclosure may be Thin Film Transistors (TFTs), or Field Effect Transistors (FETs), or other devices with same characteristics. For example, a thin film transistor used in the embodiments of the present disclosure may include, but is not limited to, an oxide TFT or a Low Temperature Poly-silicon TFT (LTPS TFT). Here, no limit is made thereto in the embodiments of the present disclosure.

In order to provide better experiences for users in use, in some technologies, more and more electronic devices with LCD display panels are equipped with optical sensors (also referred to as light sensors). For example, a handheld electronic device, such as a tablet computer, a Notebook (NB), and a mobile phone, is equipped with an optical sensor. An optical sensor is usually located above a display panel of an electronic device, so that the electronic device may adjust display brightness of the display panel of the electronic device automatically according to brightness of light detected by the optical sensor in an environment where the electronic device is located, to save power consumption and bring better visual experiences to a user.

However, for a solution of implementing adjustment of brightness of an LCD display panel by setting an optical sensor in some technologies, in one aspect, an optical sensor is relatively high in cost, so an electronic device with the optical sensor is correspondingly relatively high in cost; in another aspect, the optical sensor and an LCD display panel are usually arranged independently, so a relatively large space of a main board is occupied, which is unfavorable for implementing function integration of a whole machine for the electronic device; and in yet another aspect, an additional through hole is often opened in the LCD display panel in order to facilitate collection of light to be detected (e.g., ambient light) by the optical sensor in the electronic device, so that a screen-to-body ratio is reduced, which is unfavorable for achieving a full screen of the electronic device.

An embodiment of the present disclosure provides a brightness control apparatus. In practical applications, the brightness control apparatus may be applied to a display panel of an electronic device, and can achieve detection of brightness of light in an environment where the electronic device is located and automatically adjust display brightness of the display panel in the electronic device according to the brightness of the light in the environment where the electronic device is located. For example, the electronic device may be a tablet computer, a notebook, and a mobile phone, etc. For example, the display panel may be an LCD display panel.

FIG. 1 is a schematic diagram of a structure of a brightness control apparatus in an exemplary embodiment of the present disclosure. As shown in FIG. 1, the brightness control apparatus may include an optical detection circuit 11 and an integrated circuit chip 12 connected with the optical detection circuit 11.

The optical detection circuit 11 includes at least one transistor, configured to detect a light intensity of light (e.g., ambient light) to be detected corresponding to an environment where a display panel is located, and generate an electrical signal corresponding to the light intensity of the light to be detected. The Integrated Circuit (IC) chip 12 is configured to generate a brightness detection value of the light to be detected based on the electrical signal corresponding to the light intensity of the light to be detected, and adjust display brightness of the display panel according to the brightness detection value of the light to be detected.

According to the brightness control apparatus provided in the embodiment of the present disclosure, on one hand, the optical detection circuit includes the at least one transistor, so that a cost of the optical detection circuit is lower than that of an optical sensor, and compared with an electronic device with an optical sensor, a cost of adjusting the display brightness of the display panel may be reduced effectively, and a cost of the electronic device may be reduced. On the other hand, both the optical detection circuit and the integrated circuit chip are arranged in the display panel rather than independently outside the display panel, so that integration of a function of detecting light to be detected (e.g., ambient light) in the optical detection circuit of the display panel may be achieved and integration of functions of collecting light to be detected (e.g., ambient light) and adjusting brightness in the integrated circuit chip of the display panel may be achieved, which is conductive to function integration of a whole machine for the electronic device to with the display panel is applied, and compared with an electronic device with an optical sensor, an area of a main board may be reduced to increase a screen-to-body ratio, which is conductive to achieving a full screen of the electronic device.

The optical detection circuit will be described below in combination with the drawings.

Figure 2:
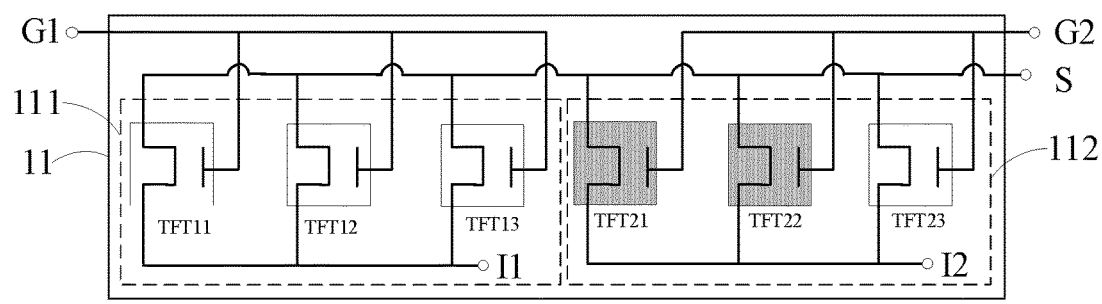
FIG. 2 is a schematic diagram of a structure of an optical detection circuit in an exemplary embodiment of the present disclosure.

In an exemplary embodiment, as shown in FIGS. 1 and 2, the optical detection circuit 11 may include a detection transistor unit 111 and a reference transistor unit 112. The detection transistor unit 111 is configured to be illuminated by light to be detected (e.g., ambient light). The reference transistor unit 112 is configured to be not illuminated by the light to be detected.

In an exemplary embodiment, at least part of a channel region of the detection transistor unit 111 may be arranged to be not covered by a shading layer, so that the detection transistor unit 111 is in an environment where the light to be detected is incident and capable of receiving the light to be detected.

In an exemplary embodiment, any shading structure covering the reference transistor unit 112, e.g., a shading layer or a Black Matrix (BM), may be arranged in a region where the reference transistor unit 112 is located, so that the reference transistor unit is in an environment where no light to be detected is incident, and is not illuminated by the light to be detected.

In an exemplary embodiment, as shown in FIG. 2, the detection transistor unit 111 may include at least one first transistor, configured to be illuminated by the light to be detected (e.g., ambient light), detect a light intensity of the light to be detected, and generate a first electrical signal I1 corresponding to the light intensity of the light to be detected. The reference transistor unit 112 may include at least one second transistor, configured to be not illuminated by the light to be detected, and generate a second electrical signal I2 corresponding to a light intensity of an environment where no light to be detected is incident. For example, parameters of the second transistor and the first transistor may be set to be consistent (for example, multiple components (including a gate electrode, a source drain electrode, and an active layer) of the two may be made of a same material and have a same size). Since the second transistor is configured to be not illuminated by the light to be detected, the light intensity detected by the second transistor may be used as a reference light intensity, and the corresponding second electrical signal I2 is a reference electrical signal.

In an exemplary embodiment, the detection transistor unit 111 may be formed by an arrangement of N first transistors, and the reference transistor unit 112 may be formed by an arrangement of N second transistors, wherein N is an integer more than or equal to 2. For example, the N first transistors may be arranged in rows or columns, and the N second transistors may be arranged in rows or columns. Therefore, by arranging that a detection transistor unit is formed by multiple TFTs and a reference transistor unit is formed by multiple TFTs, so that a detection light intensity error brought by a transistor manufacturing process may be reduced and a detection light intensity error caused by impedance differences of TFTs may be effectively reduced.

In an exemplary embodiment, control electrodes of the N first transistors are connected as a first control terminal of the optical detection circuit (i.e., a control terminal of the detection transistor unit), so as to receive a first control signal G1 provided by the integrated circuit chip. Control electrodes of the N second transistors are connected as a second control terminal of the optical detection circuit (i.e., a control terminal of the reference transistor unit), so as to receive a second control signal G2 provided by the integrated circuit chip. First electrodes of the N first transistors and first electrodes of the N second transistors are connected as an input terminal of the optical detection circuit (namely the first electrodes of the N first transistors are connected as a first terminal of the detection transistor unit, the first electrodes of the N second transistors are connected as a first terminal of the reference transistor unit, and the first terminal of the detection transistor unit and the first terminal of the reference transistor unit are connected as the input terminal of the optical detection circuit), so as to receive an input signal S provided by the integrated circuit chip. For example, the first control terminal of the optical detection circuit may be electrically connected with the second control terminal of the optical detection circuit, so as to receive common signal control.

For example, taking the first transistor and the second transistor being TFTs and N being 3 as an example, as shown in FIG. 2, the detection transistor unit 111 may include a TFT11, a TFT2, and a TFT13. The detection transistor unit 111 is configured to receive a working voltage (including an input signal S and a first control signal G1), detect a light intensity of light to be detected, and generate a corresponding first electrical signal I1. The reference transistor unit 112 may include a TFT21, a TFT22, and a TFT23. The reference transistor unit 112 is configured to receive a working voltage (including the input signal S and a second control signal G2), and generate a corresponding second electrical signal I2 in a case that the light to be detected is shielded. For example, as shown in FIG. 2, a control electrode of the TFT11, a control electrode of the TFT12, and a control electrode of the TFT13 are connected as a first control terminal of the optical detection circuit, so as to receive the first control signal G1 provided by the integrated circuit chip. A control electrode of the TFT21, a control electrode of the TFT22, and a control electrode of the TFT23 are connected as a second control terminal of the optical detection circuit, so as to receive the second control signal G2 provided by the integrated circuit chip. A first electrode of the TFT11, a first electrode of the TFT12, a first electrode of the TFT13, a first electrode of the TFT21, a first electrode of the TFT22, and a first electrode of the TFT23 are connected as an input terminal of the optical detection circuit, so as to receive the input signal S provided by the integrated circuit chip.

For example, as shown in FIG. 2, voltages at the first electrodes of the TFTs in the detection transistor unit 111 are the same as voltages at the first electrodes of the TFTs in the reference transistor unit 112, voltages at the control electrodes of the TFTs in the detection transistor unit 111 are the same as voltages at the control electrodes of the TFTs in the reference transistor unit 112, a sum of currents at the second electrodes of the multiple TFTs in the detection transistor unit 111 is used as the first electrical signal I1 corresponding to the light intensity of the light to be detected, and a sum of currents at the second electrodes of the multiple TFTs in the reference transistor unit 112 is used as the second electrical signal I2 corresponding to the light intensity of the light to be detected. Therefore, since an output current of a single TFT is relatively low, by using the sum of the currents at the second electrodes of the multiple TFTs in the detection transistor unit 111 as the first electrical signal I1 corresponding to the light intensity of the light to be detected and the sum of the currents at the second electrodes of the multiple TFTs in the reference transistor unit 112 as the second electrical signal I2 corresponding to the light intensity of the light to be detected, it may be favorable for the integrated circuit chip to collect the first electrical signal I1 and the second electrical signal I2.

In an exemplary embodiment, the multiple TFTs in the detection transistor unit and the multiple TFTs in the reference transistor unit are TFTs with same parameters. For example, multiple components (for example, including a control electrode, a first electrode, a second electrode, and an active layer) of the multiple TFTs in the detection transistor unit and the multiple TFTs in the reference transistor unit may be made of a same material and have a same size. Since the multiple TFTs in the reference transistor unit are configured to be not illuminated by the light to be detected, a light intensity detected by the multiple TFTs in the reference transistor unit may be used as a reference light intensity, a corresponding second electrical signal I2 is a reference electrical signal, so that the reference transistor unit may be used as a contrast unit of the detection transistor unit. Therefore, detection accuracy may be improved.

Among them, when the multiple TFTs in the detection transistor unit are used for detecting the light to be detected (e.g., ambient light), channel regions of the multiple TFTs in the detection transistor unit are used for detecting the light. An active layer includes a source region, a drain region, and a channel region located between the source region and the drain region, wherein the source region is a region where the active layer is in contact with a source, the drain region is a region where the active layer is in contact with a drain, and the channel region corresponds to a gap between the source and the drain, and is a part between the source region and the drain region. Therefore, at least part of a channel region of the detection transistor unit is arranged to be illuminated by the light to be detected (e.g., ambient light). In such case, a working voltage (including an input signal S, a first control signal G1, and a second control signal G2) is provided for the optical detection circuit when the light to be detected (e.g., ambient light) is detected. When the detection transistor unit is illuminated by the light to be detected (e.g., ambient light), a characteristic of the detection transistor unit may be influenced by the ambient light, and the detection transistor unit may generate a first electrical signal I1 corresponding to a light intensity of the light to be detected. The reference transistor unit is not illuminated by the light to be detected, so the reference transistor unit may generate a second electrical signal I2 (i.e., a reference electrical signal) corresponding to a light intensity in case of not being illuminated by the light to be detected. Then, the integrated circuit chip collects the first electrical signal I1 generated by the detection transistor unit and the second electrical signal I2 generated by the reference transistor unit, and compares the first electrical signal I1 and the second electrical signal I2, so as to obtain an influence of the light to be detected (e.g., ambient light) on the detection transistor unit and further calculate brightness of the light to be detected (e.g., ambient light). Therefore, in the exemplary embodiment of the present disclosure, integrating the optical detection circuit on the display panel instead of an optical sensor additionally arranged on the electronic device may reduce the cost of the electronic device, save space occupied by the optical sensor, and improve product competitiveness of the electronic device.

For example, when the input signal S provided by the integrated circuit chip is a negative voltage signal, voltages at source terminals of the TFTs in the detection transistor unit are the same as voltages at source terminals of the TFTs in the reference transistor unit, voltages at gate terminals of the TFTs in the detection transistor unit are the same as voltages at gate terminals of the TFTs in the reference transistor unit, a sum of currents at drain terminals of the multiple TFTs in the detection transistor unit may be used as the first electrical signal I1 corresponding to the light intensity of the light to be detected (e.g., ambient light), and a sum of currents at drain terminals of the multiple TFTs in the reference transistor unit is used as the second electrical signal I2 corresponding to the light intensity in case of not being illuminated by the light to be detected. When the input signal S provided by the integrated circuit chip is a positive voltage signal, voltages at the drain terminals of the TFTs in the detection transistor unit are the same as voltages at the drain terminals of the TFTs in the reference transistor unit, the voltages at the gate terminals of the TFTs in the detection transistor unit are the same as the voltages at the gate terminals of the TFTs in the reference transistor unit, a sum of currents at the source terminals of the multiple TFTs in the detection transistor unit is used as the first electrical signal I1 corresponding to the light intensity of the light to be detected, and a sum of currents at the source terminals of the multiple TFTs in the reference transistor unit may be used as the second electrical signal I2 corresponding to the light intensity of the light to be detected.

In an exemplary embodiment, it may be set that parameters of the detection transistor unit and the reference transistor unit, except for illumination parameters, are basically the same. Therefore, influences of factors, such as a difference in positions of transistors and an offset caused by a temperature change to volt-ampere characteristic curves of the transistors, on accuracy of an optical detection circuit in detecting a light intensity of light to be detected may be avoided, and it may be ensured that a difference between a first electrical signal I1 and a second electrical signal I2 that are generated by the optical detection circuit is only caused by a difference between the illumination parameters. Therefore, the accuracy of the optical detection circuit in detecting the light intensity of the light to be detected (e.g., ambient light) may be improved.

The integrated circuit chip in the embodiment of the present disclosure will be described below by taking the optical detection circuit including the detection transistor unit and the reference transistor unit as an example in combination with the drawings.

In an exemplary embodiment, according to different application scenarios of the integrated circuit chip, the integrated circuit chip may be a Touch and Display Driver Integration (TDDI) chip, or, may be a Display Driver IC (DDI) chip, or of course, it may be another chip, for example, including, but is not limited to, a Touch IC (TIC) or a Gate IC. Here, no limit is made thereto in the embodiment of the present disclosure.

In an exemplary embodiment, as shown in FIG. 1, the integrated circuit chip 12 may include a power supply module 121, connected with a first terminal 1111 of the detection transistor unit, a first terminal 1121 of the reference transistor unit, a control terminal 1112 of the detection transistor unit, and a control terminal 1122 of the reference transistor unit, and configured to provide working voltages (including an input signal S, a first control signal G1, and a second control signal G2) to the detection transistor unit 111 and the reference transistor unit 112.

In an exemplary embodiment, as shown in FIG. 1, the integrated circuit chip 12 may include a first pin P1, a second pin P2, and a third pin P3. The power supply module 121 is connected with the first terminal 1111 of the detection transistor unit through the first pin P1 and a first lead-out line, and is connected with the first terminal 1121 of the reference transistor unit through the first pin P1 and the first lead-out line. The power supply module 121 is connected with the control terminal 1112 of the detection transistor unit through the second pin P2 and a second lead-out line. The power supply module 121 is connected with the control terminal 1122 of the reference transistor unit through the third pin P3 and a third lead-out line. The power supply module 121 is configured to provide working voltages to the detection transistor unit 111 and the reference transistor unit 112 through the first pin P1, the second pin P2, and the third pin P3. For example, the power supply module 121 provides the input signal S (e.g., as a source signal) to the first terminal 1111 (e.g., as a source) of the detection transistor unit and the first terminal 1121 (e.g., as a source) of the reference transistor unit through the first pin P1. For example, the power supply module 121 provides the first control signal G1 to the control terminal 1112 of the detection transistor unit through the second pin P2. For example, the power supply module 121 provides the second control signal G2 to the control terminal 1122 of the reference transistor unit through the third pin P3.

Figure 3:
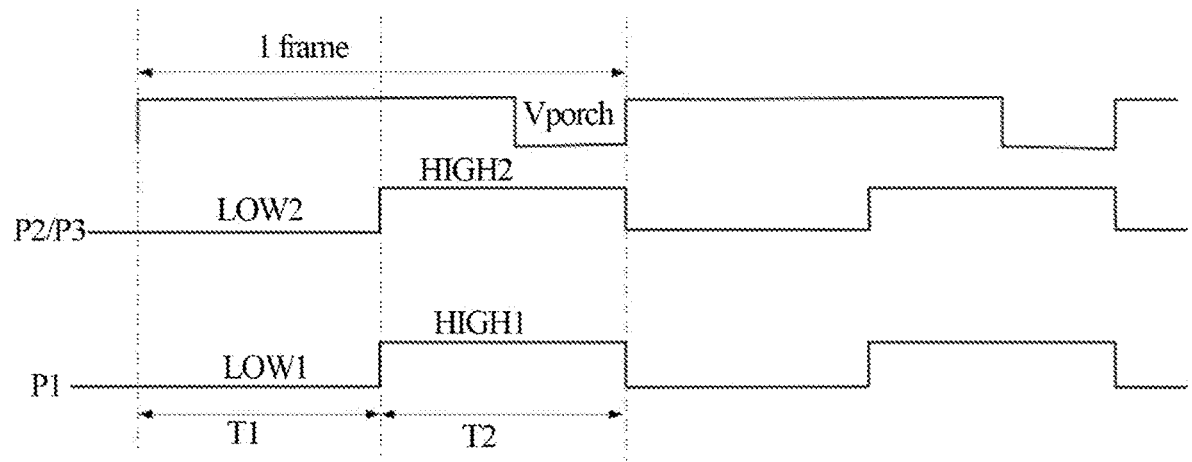
FIG. 3 is a timing diagram of an integrated circuit chip in an exemplary embodiment of the present disclosure.

In an exemplary embodiment, FIG. 3 is a timing diagram of an integrated circuit chip in an exemplary embodiment of the present disclosure. As shown in FIG. 3, a power supply module is configured to transmit a first square-wave timing signal to the detection transistor unit and the reference transistor unit, wherein each clock cycle of an input signal in the first square-wave timing signal includes a first time period T1 with a first low-level signal LOW1 and a second time period T2 with a first high-level signal HIGH1, wherein a rising edge of the first high-level signal in the first square-wave timing signal is located before a falling edge of frame synchronization idle time Vporch.

The power supply module is configured to provide and transmit a second square-wave timing signal to the detection transistor unit, wherein each clock cycle of a first control signal in the second square-wave timing signal includes a first time period T1 with a second low-level signal LOW2 and a second time period T2 with a second high-level signal HIGH2, wherein a rising edge of the second high-level signal in the second square-wave timing signal is located before the falling edge of the frame synchronization idle time Vporch.

And the power supply module is configured to provide and transmit a third square-wave timing signal to the reference transistor unit, wherein each clock cycle of a second control signal in the third square-wave timing signal includes a first time period T1 with a second low-level signal LOW2 and a second time period T2 with a second high-level signal HIGH2, wherein a rising edge of the second high-level signal in the third square-wave timing signal is located before the falling edge of the frame synchronization idle time Vporch.

Here, the frame synchronization idle time Vporch includes a front porch (also referred to as a front shoulder) and a back porch (also referred to as a back shoulder), and refers to an idle clock cycle after a horizontal synchronization signal (also referred to as a row synchronization signal, HSYNC) or a vertical synchronization signal (also referred to as a field synchronization signal, VSYNC) in a frame of signal.

For example, the first time period T1 in the first square-wave timing signal, the first time period T1 in the second square-wave timing signal, and the first time period T1 in the third square-wave timing signal are equal, and the second time period T2 in the first square-wave timing signal, the second time period T2 in the second square-wave timing signal, and the second time period T2 in the third square-wave timing signal are equal.

For example, a sum of the first time period T1 and the second time period T2 is equal to a length of a frame.

For example, timing information of the second square-wave timing signal and the third square-wave timing signal is completely the same.

In an exemplary embodiment, as shown in FIG. 1, the integrated circuit chip 12 may include: a signal collection module 122 connected with the detection transistor unit 111 and the reference transistor unit 112, and a signal processing module 123 connected with the signal collection signal 122.

The signal collection module 122 is configured to collect the first electrical signal I1 and the second electrical signal I2, and send the first electrical signal I1 and the second electrical signal I2 to the signal processing module 123.

The signal processing module 123 is configured to obtain a corresponding electrical signal difference based on the first electrical signal I1 and the second electrical signal I2, and generate the brightness detection value of the light to be detected based on the electrical signal difference.

In an exemplary embodiment, as shown in FIG. 1, the signal collection module 122 is connected with a second terminal 1113 of the detection transistor unit and a second terminal 1123 of the reference transistor unit, and is configured to collect the first electrical signal I1 from the second terminal 1113 of the detection transistor unit, and collect the second electrical signal I2 from the second terminal 1123 of the reference transistor unit.

In an exemplary embodiment, as shown in FIG. 1, the integrated circuit chip 12 may include a fourth pin P4 and a fifth pin P5. The signal collection module 122 is connected with the second terminal 1113 of the detection transistor unit through the fourth pin P4 and a fourth lead-out line. The signal collection module 122 is connected with the second terminal 1123 of the reference transistor unit through the fifth pin P5 and a fifth lead-out line. The signal collection module 122 is configured to collect the first electrical signal I1 through the fourth pin P4, and collect the second electrical signal I2 through the fifth pin P5.

In an exemplary embodiment, as shown in FIG. 3, the signal collection module may be configured to collect the first electrical signal I1 through the fourth pin P4 in an interval corresponding to the frame synchronization idle time Vporch in the second time period T2, and collect the second electrical signal I2 through the fifth pin P5 in an interval corresponding to the frame synchronization idle time Vporch in the second time period T2.

For example, as shown in FIG. 3, when control electrodes (gates) and sources of a TFT in the detection transistor unit and a TFT in the reference transistor unit are at high levels, on-state currents Ion (including the first electrical signal I1 and the second electrical signal I2) of the TFTs may be collected, wherein a collection interval is an interval in a time sequence corresponding to the frame synchronization idle time Vporch. Considering that a volt-ampere characteristic curve of a transistor may be drifted if the TFT is in a high-level on-state for a long time, a square-wave signal is used for each of the first square-wave timing signal, the second square-wave timing signal and the third square-wave timing signal, and a front porch of a duty of the square-wave signal is adjustable to ensure that intervals in the first square-wave timing signal, the second square-wave timing signal, and the third square-wave timing signal corresponding to the frame synchronization idle time Vporch are in a high-level state and sampling may be performed.

For another example, for a touch display panel with an image display function and a touch sensing function, an integrated circuit chip usually performs a touch sensing operation on a touch gesture in frame synchronization idle time Vporch (including a front porch and a back porch) during image display. Therefore, an interval of the second time period T2 in each of the first square-wave timing signal, the second square-wave timing signal, and the third square-wave timing signal corresponding to the frame synchronization idle time Vporch may be divided into two sections, wherein a front section of the interval of the second time period T2 corresponding to the frame synchronization idle time Vporch may be reserved for the signal collection module in the integrated circuit chip to collect the first electrical signal I1 and the second electrical signal I2, and a back section of the interval of the second time period T2 corresponding to the frame synchronization idle time Vporch may be reserved for the integrated circuit chip to perform the touch sensing operation.

In an exemplary embodiment, the signal collection module may include an Analog Front End (AFE).

Figure 4:
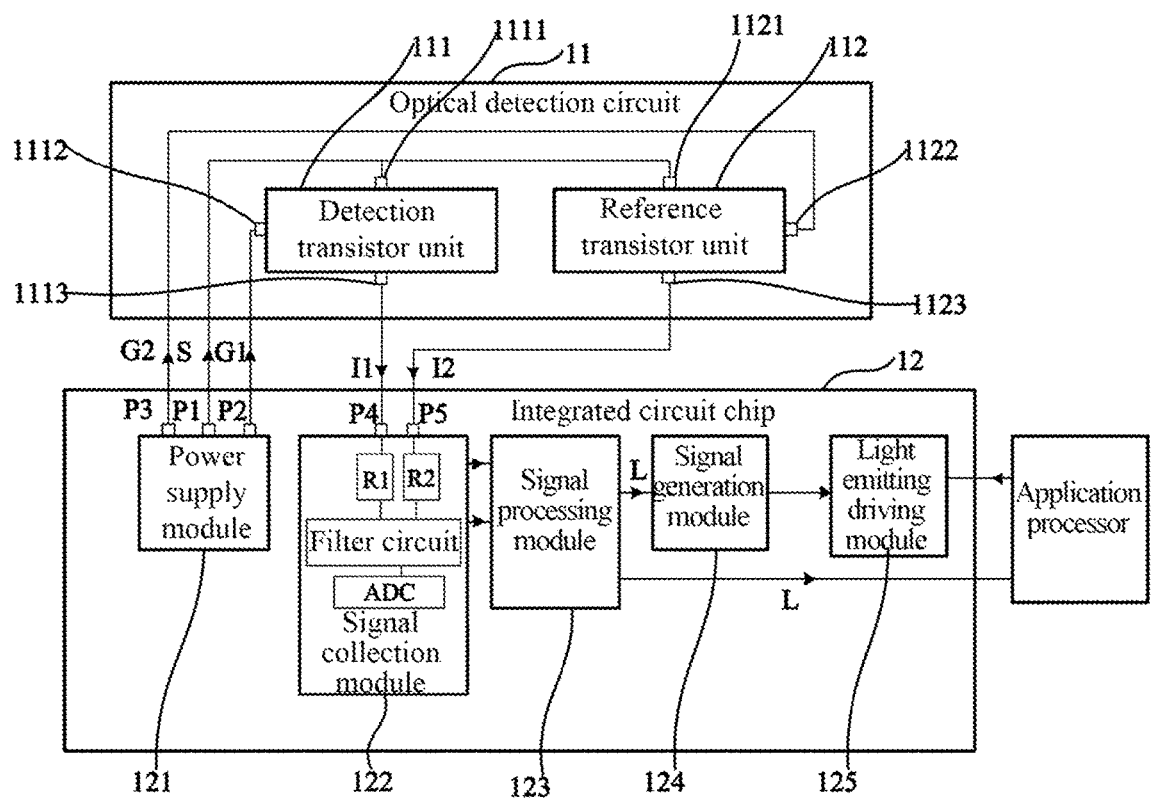
FIG. 4 is a schematic diagram of another structure of a brightness control apparatus in an exemplary embodiment of the present disclosure.

In an exemplary embodiment, as shown in FIG. 4, the signal collection module 122 may include a first resistance unit R1, a second resistance unit R2, a filter circuit for de-noising, and an Analog-to-Digital Converter (ADC) (also referred to as an analog/digital converter). The first resistance unit R1 is connected with the detection transistor unit 111 and the filter circuit for de-noising. The second resistance unit R2 is connected with the reference transistor unit 112 and the filter circuit for de-noising. The Analog-to-Digital Converter (ADC) is connected with the filter circuit for de-noising. Here, structures of circuits such as the filter circuit and the Analog-to-Digital Converter (ADC) are not limited in the embodiment of the present disclosure as long as corresponding functions may be achieved.

Of course, the signal collection module may be implemented by other modes capable of achieving corresponding functions, besides the two modes listed above. Here, no limit is made thereto in the embodiment of the present disclosure.

In an exemplary embodiment, the signal processing module may be configured to convert an electrical signal difference into a brightness detection value of light to be detected according to a following relational formula.

$$L = a \times V \times V + b \times V + c \quad (1)$$

L represents the brightness detection value of the light to be detected, V represents the electrical signal difference corresponding to a light intensity of the light to be detected, a is a first coefficient measured in advance, b is a second coefficient measured in advance, and c is a third coefficient measured in advance.

For example, as shown in FIG. 4, the signal processing module 123 may include a memory and a processor (not shown in the figure). The memory is configured to store program instructions. The processor is connected with the signal collection module 122 and the memory. The processor is configured to call the program instructions in the memory to convert the electrical signal difference V into the brightness detection value L of the light to be detected according to the above-mentioned formula (1).

In an exemplary embodiment, as shown in FIGS. 1 and 4, the integrated circuit chip 12 may include a signal processing module 123, a signal generation module 124, and a light emitting driving module 125. The signal generation module 124 may be connected with the signal processing module 123 and the light emitting driving module 125.

The signal processing module 123 may be configured to generate the brightness detection value L of the light to be detected based on the electrical signal (for example, including the first electrical signal I1 and the second electrical signal I2) corresponding to the light intensity of the light to be detected, and send the brightness detection value L of the light to be detected to the signal generation module 124.

The signal generation module 124 may be configured to generate a corresponding first driving signal based on the brightness detection value L of the light to be detected, and send the first driving signal to the light emitting driving module 125.

The light emitting driving module 125 may be configured to control display brightness of the display panel based on the first driving signal. Therefore, brightness adjustment of the display panel is completed in the integrated circuit chip according to the brightness detection value of the light to be detected, so that functions of detection of light to be detected and brightness adjustment may be added on a premise of not increasing a cost and a size.

For example, the brightness control apparatus provided in the embodiment of the present disclosure may be applied to an electronic device without an optical sensor, therefore, the brightness detection value L of the light to be detected may be sent to the signal generation module in the integrated circuit chip, so that the signal generation module in the integrated circuit chip is directly used for generating a driving signal according to the brightness detection value L of the light to be detected so as to achieve adjustment and control of display brightness of the display panel.

For example, the brightness control apparatus provided in the embodiment of the present disclosure may be applied to a display apparatus with a backlight source, and the light emitting driving module may control brightness of the backlight source based on the first driving signal so as to achieve adjustment and control of display brightness of the display panel.

In an exemplary embodiment, as shown in FIGS. 1 and 4, the integrated circuit chip 12 may include a signal processing module 123 and a light emitting driving module 125. Both the signal processing module 123 and the light emitting driving module 125 may be connected with an Application Processor (AP).

The signal processing module 123 may be configured to generate the brightness detection value L of the light to be detected based on the electrical signal (for example, including the first electrical signal I1 and the second electrical signal I2) corresponding to the light intensity of the light to be detected, and send the brightness detection value L of the light to be detected to the application processor.

The light emitting driving module 125 may be configured to receive a third driving signal generated based on the brightness detection value L of the light to be detected from the application processor, and control display brightness of the display panel based on the third driving signal. Therefore, an application range of the brightness control apparatus may be widened.

For example, the brightness control apparatus provided in the embodiment of the present disclosure may be applied to an electronic device already installed with an optical sensor, therefore, the brightness detection value L of the light to be detected may be sent to the application processor in the electronic device through the signal processing module in the integrated circuit chip, so that the application processor in the electronic device is used for adjust and control display brightness of the display panel according to the brightness detection value L of the light to be detected collected by the integrated circuit chip.

Here, in the electronic device with the brightness control apparatus, the Application Processor (AP) and the brightness control apparatus may be two independent parts that are separated physically.

In an exemplary embodiment, the light emitting driving module may be configured to receive a second driving signal generated based on a user operation and sent by the application processor and control the display brightness of the display panel based on the second driving signal. Therefore, a user may adjust the display brightness of the display panel manually.

Figure 5:
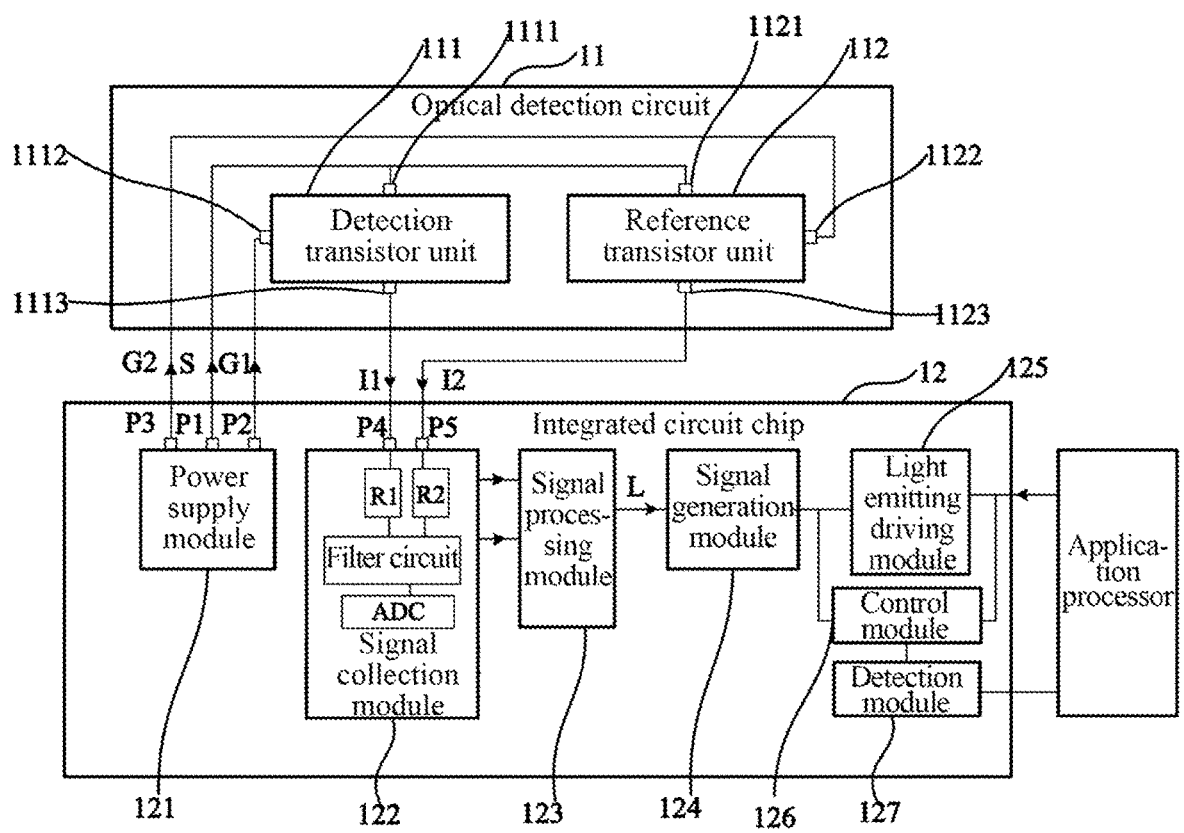
FIG. 5 is a schematic diagram of yet another structure of a brightness control apparatus in an exemplary embodiment of the present disclosure.

In an exemplary embodiment, in order to avoid a conflict between two functions of manual adjustment and automatic adjustment, as shown in FIG. 5, the integrated circuit chip 12 may further include a detection module 127 and a control module 126. The detection module 127 is connected with the control module 126. The detection module 127 is connected with an application processor. The control module 126 is connected with the signal generation module 124. The control module 126 is connected with the light emitting driving module 125. The control module 126 is connected with the application processor.

The detection module 127 is configured to detect whether a signal change occurs at a signal output terminal of the application processor.

The control module 126 is configured to control a connection state between the light emitting driving module 125, and each of the signal generation module 124 and the application processor, according to whether a signal change occurs at the signal output terminal of the application processor. Therefore, when an electronic device to which a brightness control apparatus is applied to may provide a function, achieved through the brightness control apparatus, of automatically brightness adjustment of a display panel according to a brightness detection value of light to be detected and a function, achieved through a combination of the brightness control apparatus and an application processor, of manually adjusting brightness of the display panel according to a user operation, a detection module and a control module may be integrated into an integrated circuit chip to avoid a conflict between automatic adjustment and manual adjustment according to whether a signal change occurs at a signal output terminal of the application processor, which may improve intelligence of a product and user experiences.

In an exemplary embodiment, as shown in FIG. 5, the control module 126 may be configured to, when the detection module 127 detects that there is a signal change occurring to the signal output terminal of the application processor, turn on a connection between the light emitting driving module 125 and the application processor and disconnect a connection between the light emitting driving module 125 and the signal generation module 124; and the light emitting driving module 125 is configured to, when the detection module 127 detects that there is a signal change occurring to the signal output terminal of the application processor, receive a second driving signal generated based on a user operation and sent by the application processor, and control display brightness of the display panel based on the second driving signal.

In an exemplary embodiment, as shown in FIG. 5, the control module 126 may be configured to, when the detection module 127 detects that there is no signal change occurring to the signal output terminal of the application processor, turn on a connection between the light emitting driving module 125 and the signal generation module 124 and disconnect a connection between the light emitting driving module 125 and the application processor; and the light emitting driving module 125 is configured to, when the detection module 127 detects that there is no signal change occurring to the signal output terminal of the application processor, receive a first driving signal sent by the signal generation module 124, and control display brightness of the display panel based on the first driving signal.

Therefore, when an electronic device to which a brightness control apparatus is applied provides a function, achieved through the brightness control apparatus, of automatically adjusting brightness of a display panel according to a brightness detection value of light to be detected and a function, achieved through a combination of the brightness control apparatus and an application processor, of manually adjusting brightness of the display panel according to a user operation, a relatively high priority may be set for manual adjustment, which may improve user experiences.

Of course, a solution for adjusting display brightness of a display panel may include other modes, besides multiple modes listed above. Here, no limit is made thereto in the embodiment of the present disclosure.

In an exemplary embodiment, the signal generation module may be configured to acquire a first driving signal corresponding to the brightness detection value L of the light to be detected according to a pre-stored mapping relationship between a brightness value L and a driving signal.

For example, each driving signal may be correspondingly mapped to a brightness value, or, each driving signal may be correspondingly mapped to a brightness value range. When each driving signal is correspondingly mapped to a brightness value range, the signal generation module may determine a first driving signal corresponding to a brightness value range where a brightness detection value L of light to be detected is located according to a mapping relationship between a brightness value and a driving signal.

For example, as shown in FIGS. 1 and 4, the signal generation module 124 may include a memory and a processor. The memory is configured to store a mapping relationship between a brightness value L and a driving signal and program instructions. The processor may be connected with the light emitting driving module 125 and the memory. The processor may be configured to call the program instructions in the memory to acquire a first driving signal corresponding to a brightness detection value L of light to be detected according to the pre-stored mapping relationship between the brightness value L and the driving signal, and send the first driving signal to the light emitting driving module 125.

In an exemplary embodiment, the signal generation module and the signal processing module may be combined physically. For example, the signal generation module and the signal processing module may be implemented by a Microcontroller Unit (MCU), wherein the MCU may already exist in the display panel, or may be arranged additionally. For another example, the signal generation module and the signal processing module may be implemented by a memory and a processor, wherein the processor may be configured to call program instructions in the memory to determine a corresponding electrical signal difference according to a first electrical signal I1 and a second electrical signal I2, determine a brightness detection value L of light to be detected according to the electrical signal difference, acquire a first driving signal corresponding to the brightness detection value L of the light to be detected according to the pre-stored mapping relationship between the brightness value and the driving signal, and send the first driving signal to the light emitting driving module. For example, the memory and a controller may be a memory and a controller that existing in the display panel, or a memory and a controller that are arranged additionally.

In an exemplary embodiment, the driving signal (including the first driving signal, the second driving signal, and the third driving signal) may be a Pulse Width Modulation (PWM) signal or another signal. For example, if the driving signal is a PWM signal, the mapping relationship between the brightness value and the driving signal may be a mapping relationship between the brightness value and a duty of the PWM signal.

In an exemplary embodiment, taking the integrated circuit chip being a Touch and Display Driver Integration (TDDI) chip as an example, the Touch and Display Driver Integration (TDDI) chip may include a data communication interface, configured to transmit a touch data packet. Then, the signal processing module may be configured to add the brightness detection value of the light to be detected into the touch data packet to obtain a processed touch data packet, and send the processed touch data packet to the application processor through the data communication interface so as to send the brightness detection value of the light to be detected to the application processor. Therefore, the brightness detection value may be transmitted to the application processor by multiplexing the data communication interface without adding any additional communication port, which may reduce a cost.

In an exemplary embodiment, the data communication interface may include any one or more of an Inter-integrated Circuit (I2C) interface, a Serial Peripheral Interface (SPI), and a General Purpose Input/Output (GPIO) interface.

In an exemplary embodiment, the brightness detection value may be 2-byte data.

Figure 6:
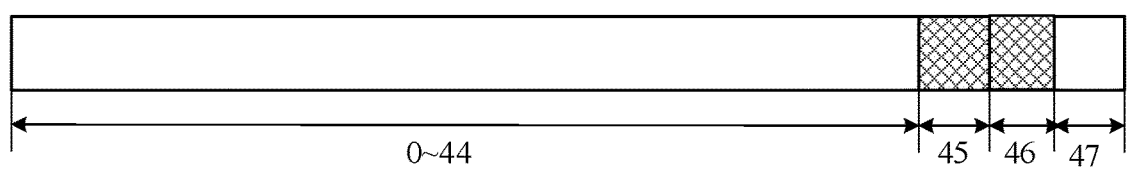
FIG. 6 is a schematic diagram of a data format of a brightness detection value transmitted by an integrated circuit chip in an exemplary embodiment of the present disclosure.

In an exemplary embodiment, as shown in FIG. 6, taking the touch data packet being 48-byte data as an example, the brightness detection value may be added into a 45th byte and 46th byte of the touch data packet. For example, the 45th byte may be high-order data of the brightness detection value, and the 46th byte may be low-order data of the brightness detection value. Of course, the brightness detection value may be arranged at another position of the touch data packet. Here, no limit is made thereto in the embodiment of the present disclosure.

An embodiment of the present disclosure also provides a display apparatus. In an exemplary embodiment, the display apparatus may include a display panel and the brightness control apparatus in one or more of the above-mentioned exemplary embodiments.

Figure 7:
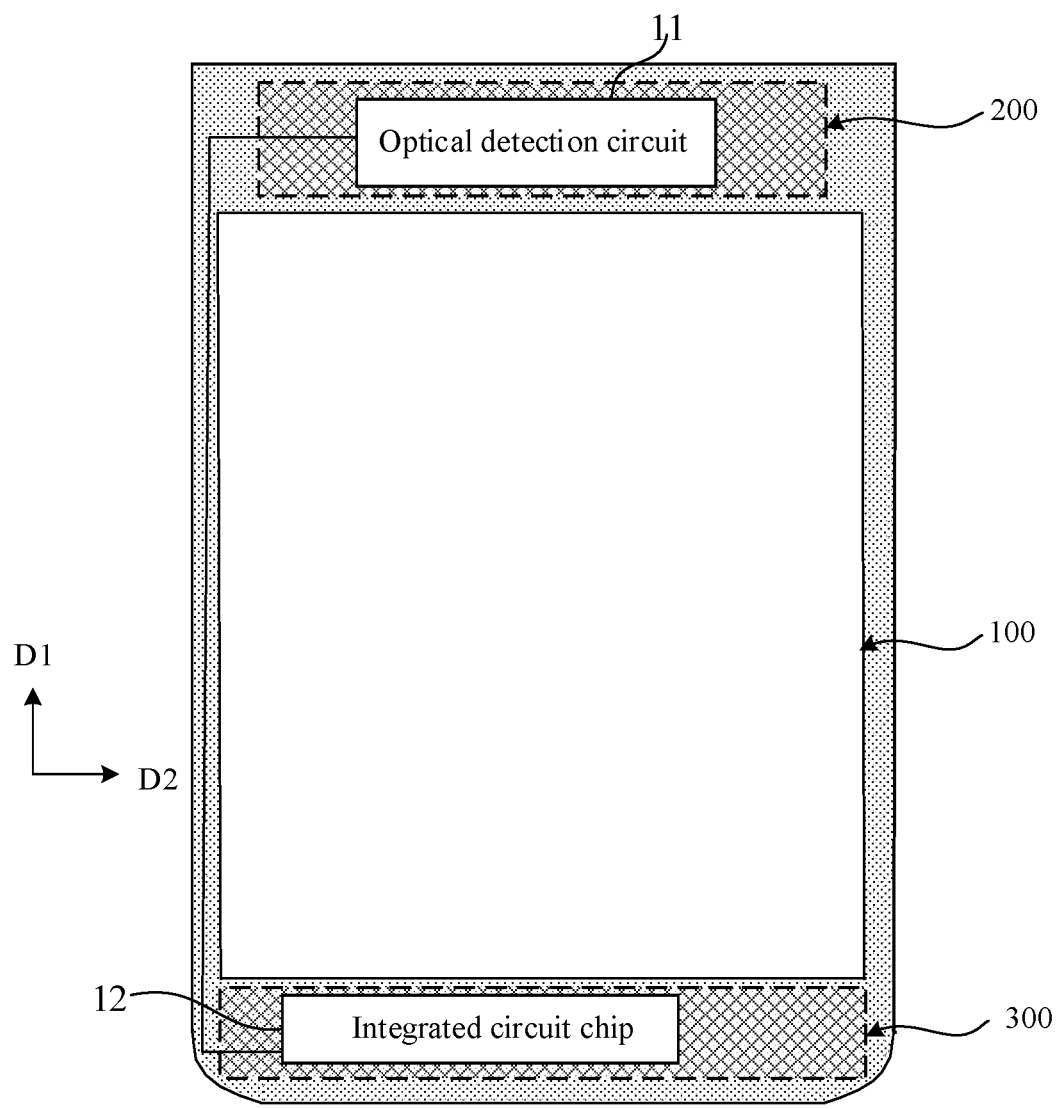
FIG. 7 is a schematic diagram of a structure of a display apparatus in an exemplary embodiment of the present disclosure.
Figure 8:
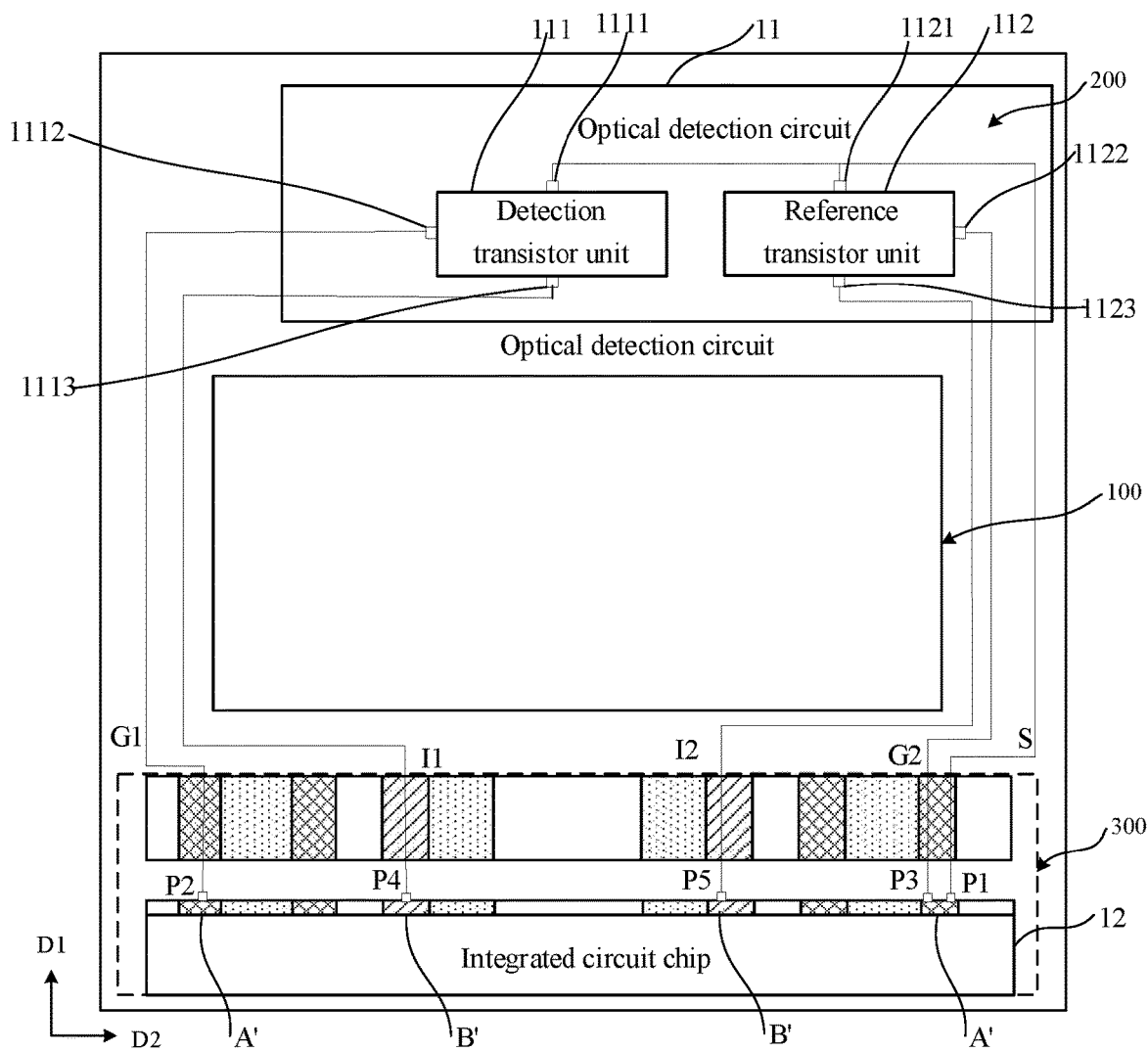
FIG. 8 is a schematic diagram of another structure of a display apparatus in an exemplary embodiment of the present disclosure.

As shown in FIGS. 7 and 8, on a plane parallel to the display panel, the display panel may include a display region 100 and a peripheral region surrounding the display region. The peripheral region may include a bonding region 300 on a side of the display region 11 in a direction opposite to a first direction D1 and a border region 200 on a side of the display region 11 in the first direction D1. The brightness control apparatus may include an optical detection circuit 11 located in the border region 200 and an integrated circuit chip 12 in a bonding connection with the bonding region 300.

According to the display apparatus provided in the embodiment of the present disclosure, the optical detection circuit is used for detecting an electrical signal corresponding to a light intensity of light to be detected in an environment where the display panel is located, and the integrated circuit chip is used for collecting the electrical signal, generated by the optical detection circuit, corresponding to the light intensity of the light to be detected, and display brightness of the display panel is controlled based on the electrical signal corresponding to the light intensity of the light to be detected. Therefore, on one hand, the optical detection circuit includes at least one transistor, so that a cost of the optical detection circuit is lower than that of an optical sensor, and compared with an electronic device installed with the optical sensor, a cost of adjusting display brightness of the display panel may be reduced effectively, and a cost of the electronic device may be reduced. On the other hand, the optical detection circuit is located in the border region in the display panel, and the integrated circuit chip is located in the bonding region in the display panel, so that both the optical detection circuit and the integrated circuit chip are arranged in the display panel rather than independently outside the display panel, and integration of a function of detection of light to be detected in the border region of the display panel may be achieved and integration of functions of collection of light to be detected and brightness adjustment in the integrated circuit chip in the bonding region of the display panel may be achieved, which is conductive to function integration of a whole machine of the electronic device to which the display panel is applied, and compared with an electronic device installed with an optical sensor, an area of a main board may be reduced to increase a screen-to-body ratio, which is conductive to achieving a full screen of the electronic device.

In an exemplary embodiment, the display apparatus may further include a light emitting device, wherein the light emitting device may be located on a display side of the display panel, or, the light emitting device may be located on a side opposite to the display side of the display panel, or, the light emitting device may be located on a peripheral side of the display panel. For example, when the light emitting device is a front light source, the light emitting device may be located on the display side of the display panel; when the light emitting device is a direct-down style backlight source, the light emitting device may be located on the side opposite to the display side of the display panel 1; and when the light emitting device is a side-entry style backlight source, the light emitting device may be located on the peripheral side of the display panel.

Figure 9:
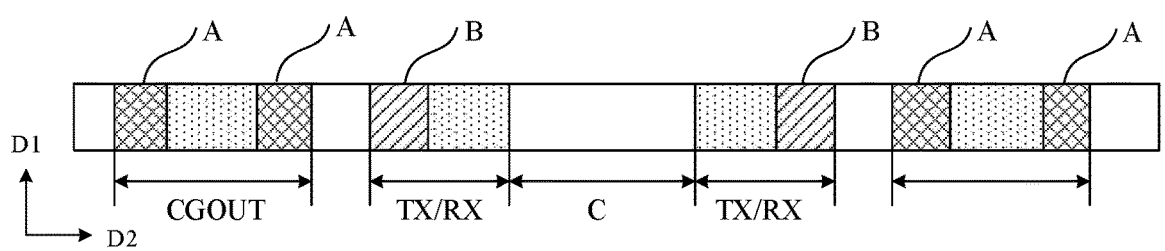
FIG. 9 is a schematic diagram of wiring distribution of a bonding region in a display panel in an exemplary embodiment of the present disclosure.

In an exemplary embodiment, as shown in FIGS. 8 and 9, on a plane parallel to a display panel and in a second direction D2 intersecting with a first direction D1, a bonding region 300 may include a first central region C and a timing signal wiring region CGOUT. The timing signal wiring region CGOUT is located on at least one of a side of the first central region C in the second direction D2 and a side of the first central region C in a direction opposite to the second direction D2. The timing signal wiring region CGOUT includes a first boundary close to the first central region C in the second direction D2, a second boundary opposite to the first boundary, and a first lead region A. The first lead region A is located on at least one of a side of the first boundary close to the second boundary in the timing signal wiring region CGOUT and a side of the second boundary close to the first boundary in the timing signal wiring region CGOUT. The first lead region A may include at least one of a first lead-out line, a second lead-out line, and a third lead-out line.

An integrated circuit chip 12 may include a first pin P1, a second pin P2, and a third pin P3. The integrated circuit chip 12 is connected with a first terminal 1111 of a detection transistor unit through the first pin P1 and the first lead-out line, and is connected with a first terminal 1121 of a reference transistor unit through the first pin P1 and the first lead-out line. The integrated circuit chip 12 is connected with a control terminal 1112 of the detection transistor unit through the second pin P2 and the second lead-out line. The integrated circuit chip 12 is connected with a control terminal 1122 of the reference transistor unit through the third pin P3 and the third lead-out line. The integrated circuit chip 12 is configured to provide working voltages (including an input signal S, a first control signal G1, and a second control signal G2) to the detection transistor unit 111 and the reference transistor unit 112 through the first pin P1, the second pin P2, the third pin P3, the first lead-out line, the second lead-out line, and the third lead-out line.

In an exemplary embodiment, as shown in FIGS. 8 and 9, on the plane parallel to the display panel and in the second direction D2 intersecting with the first direction D1, the bonding region 300 may further include a touch signal wiring region TX/RX between the first central region C and the timing signal wiring region CGOUT. The touch signal wiring region TX/RX includes a first boundary close to the first central region C in the second direction D2, a second boundary opposite to the first boundary, and a second lead region B. The second lead region B is located on a side of the second boundary close to the first boundary in the touch signal wiring region TX/RX. The second lead region B may include a fourth lead-out line and a fifth lead-out line. The integrated circuit chip 12 may include a fourth pin P4 and a fifth pin P5. The integrated circuit chip 12 is connected with a second terminal 1113 of the detection transistor unit through the fourth pin P4 and the fourth lead-out line. The integrated circuit chip 12 is connected with a second terminal 1123 of the reference transistor unit through the fifth pin P5 and the fifth lead-out line. The integrated circuit chip 12 is configured to collect a first electrical signal I1 through the fourth pin P4 and the fourth lead-out line, and collect a second electrical signal I2 through the fifth pin P5 and the fifth lead-out line. Therefore, the fourth lead-out line corresponding to the fourth pin P4 and the fifth lead-out line corresponding to the fifth pin P5 are distributed on an edge of the touch signal wiring region TX/RX, which may prevent the fourth lead-out line corresponding to the fourth pin P4 and the fifth lead-out line corresponding to the fifth pin P5 from intersecting with touch signal wirings in the touch signal wiring region TX/RX in the display region.

In an exemplary embodiment, a touch driving signal TX wiring and a touch sensing signal RX wiring may be distributed in the touch signal wiring region TX/RX.

In an exemplary embodiment, as shown in FIG. 9, a quantity of timing signal wiring regions CGOUT may be reserved as two, and correspondingly, a quantity of touch signal wiring regions TX/RX may be reserved as two.

Figure 10:
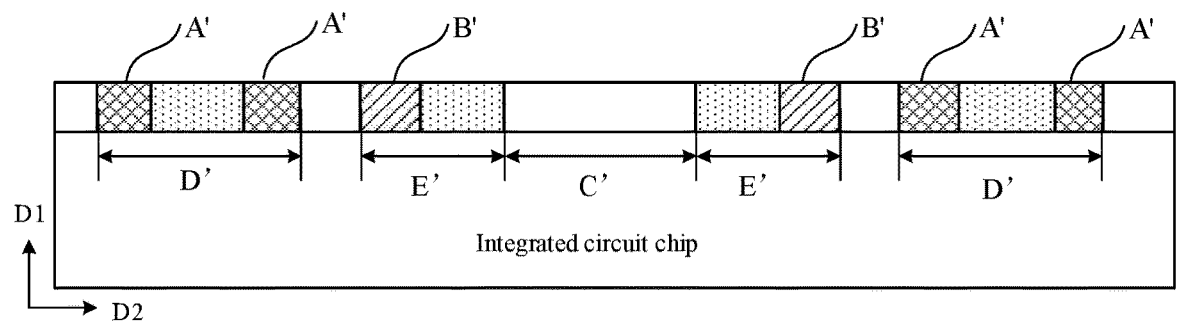
FIG. 10 is a schematic diagram of pin distribution of an integrated circuit chip in an exemplary embodiment of the present disclosure.

In an exemplary embodiment, as shown in FIGS. 8 to 10, an arrangement mode for a bonding pin region of the integrated circuit chip 12 corresponds to an arrangement mode for the bonding region 300 of the display panel. For example, as shown in FIG. 10, on a plane parallel to the display panel and in the second direction D2 intersecting with the first direction D1, the bonding pin region of the integrated circuit chip 12 may include a second central region C', a first region D' located on at least one side of the second central region C' and corresponding to the timing signal wiring region CGOUT, and a second region E' located between the second central region C' and the first region D' and corresponding to the touch signal wiring region TX/RX.

The first region D' includes a first boundary close to the second central region C' in the second direction D2, a second boundary opposite to the first boundary, and a first sub-region A'. The first sub-region A' is located on at least one of a side of the first boundary close to the second boundary in the first region D' and a side of the second boundary close to the first boundary in the first region D'. The first sub-region A' may include a first pin P1, a second pin P2, and a third pin P3.

The second region E' includes a first boundary close to the second central region C' in the second direction D2, a second boundary opposite to the first boundary, and a second sub-region B'. The second sub-region B' is located on a side of the second boundary close to the first boundary in the second region E'. The second sub-region B' may include a fourth pin P4 and a fifth pin P5.

Therefore, on one hand, the pin P1 to the pin P3 may be reserved in the first sub-region A' in the first region D' on a single side corresponding to the timing signal wiring region CGOUT, so that application scenarios of the display apparatus may be enriched. For example, taking a clock signal CLK wiring being distributed in the timing signal wiring region CGOUT as an example, when the display apparatus where the integrated circuit chip is located is a Gate Driver On Array (GOA) product, wirings corresponding to the pin P1 to the pin P3 may be distributed on an inner side of the CLK wiring, at this time, as far as possible away from a cutting line on an outer side of the display panel, so that an Electro-Static Discharge (ESD) specification may be satisfied; and when the display apparatus where the integrated circuit chip is located is driven by a Gate driver IC chip, the wirings corresponding to the pin P1 to the pin P3 may be distributed on an outer side of the CLK wiring, so that the wirings corresponding to the pin P1 to the pin P3 may be prevented from intersecting with the clock signal CLK wiring. On another hand, the pin P4 and the pin P5 are reserved in the second sub-region B' in the second region E', so that wirings corresponding to the pin P4 and the pin P5 may be prevented from intersecting with a touch signal wiring in the touch signal wiring region TX/RX. On yet another hand, the pin P1 to the pin P3 are reserved in each of first regions D' corresponding to two timing signal wiring regions CGOUT, and the pin P4 and the pin P5 are reserved in each of second regions E' corresponding to two touch signal wiring regions TX/RX, so that it may be ensured that wiring impedances of the detection transistor unit and the reference transistor unit on the display panel are consistent, and a wiring pressure brought by a concentrated distribution of wirings on one side may be avoided.

For example, as shown in FIGS. 8 to 10, on the plane parallel to the display panel, the bonding region 300 may include a left-side CGOUT region, a left-side TX/RX region, a first central region C, a right-side TX/RX region, and a right-side CGOUT region that are sequentially arranged along the second direction D2, wherein two first lead regions A are arranged in each of the left-side CGOUT region and the right-side CGOUT region, including a left-side first lead region A and a right-side first lead region A; and a second lead region B is arranged in each of the left-side TX/RX region and the right-side TX/RX region. Taking this as an example, a first lead-out line (a wiring connected with a pin P1 in FIG. 8) and a third lead-out line (a wiring connected with a pin P3 in FIG. 8) may be arranged in the right-side first lead region A in the right-side CGOUT region, a second lead-out line (a wiring connected with a pin P2 in FIG. 8) may be arranged in the left-side first lead region A in the left-side CGOUT region, a fourth lead-out line (a wiring connected with a pin P4 in FIG. 8) may be arranged in the second lead region B in the left-side TX/RX region, and a fifth lead-out line (a wiring connected with a pin P5 in FIG. 8) may be arranged in the second lead region B in the right-side TX/RX region.

Figure 11:
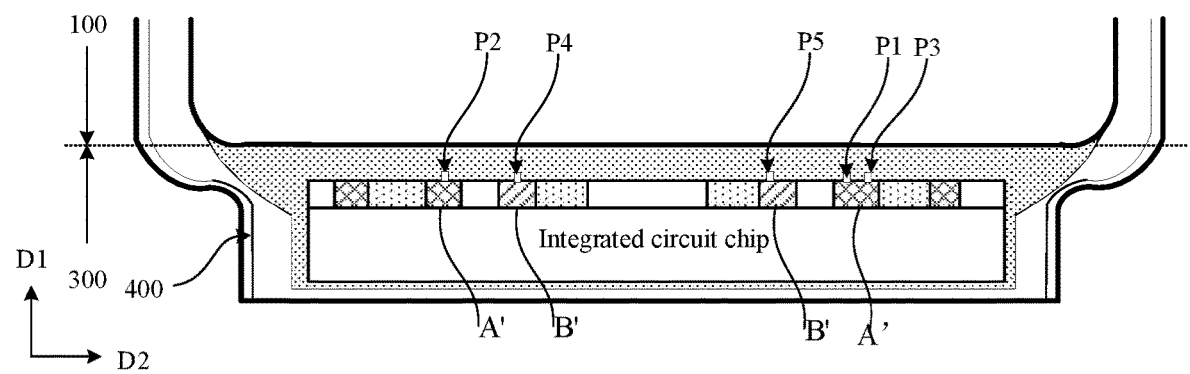
FIG. 11 is a schematic diagram of a part of a display apparatus in an exemplary embodiment of the present disclosure.

In an exemplary embodiment, as shown in FIG. 11, the display panel may further include a cutting region arranged on a peripheral side of the bonding region 300. The cutting region may include at least one cutting line 400, and a shape of the at least one cutting line 400 is the same as a contour of the bonding region 300.

In an exemplary embodiment, as shown in FIG. 11, the first pin P1 may be connected with the first terminal of the detection transistor unit and the first terminal of the reference transistor unit through the first lead-out line in the first lead region on a side of the timing signal wiring region away from the cutting line 400, the second pin P2 may be connected with the control terminal of the detection transistor unit through the second lead-out line in the first lead region on the side of the timing signal wiring region away from the cutting line 400, and the third pin P3 may be connected with the control terminal of the reference transistor unit through the third lead-out line in the first lead region on the side of the timing signal wiring region away from the cutting line 400. Therefore, the wirings corresponding to the pin P1 to the pin P3 may be distributed on the inner side of the CLK wiring, as far as possible away from the cutting line on the outer side of the display panel, and an ESD specification may be satisfied.

In an exemplary embodiment, the display apparatus may include, but is not limited to, an LCD display apparatus.

In an exemplary embodiment, the display apparatus may be any product or component with a display function, such as a mobile phone, a tablet computer, a television, a display, a notebook computer, a digital photo frame, or a navigator.

Technical details undisclosed in the embodiment of the display apparatus of the present embodiment are understood by those skilled in the art with reference to the descriptions in the embodiment of the brightness control apparatus of the present disclosure, and will not be repeated here.

An embodiment of the present disclosure also provides a brightness control method. The brightness control method may be applied to the brightness control apparatus in one or more of the above-mentioned exemplary embodiments. The brightness control method may include acts 1201 and 1202.

In act 1201, a light intensity of light to be detected corresponding to an environment where a display panel is located is detected, and an electrical signal corresponding to the light intensity of the light to be detected is generated.

In act 1202, a brightness detection value of the light to be detected is generated based on the electrical signal corresponding to the light intensity of the light to be detected, and display brightness of the display panel is adjusted according to the brightness detection value of the light to be detected.

Technical details undisclosed in the embodiment of the brightness control method of the present embodiment are understood by those skilled in the art with reference to the descriptions in the embodiment of the brightness control apparatus of the present disclosure, and will not be repeated here.

Although the implementation modes of the present disclosure are disclosed above, the contents are only implementation modes for easily understanding the present disclosure and not intended to limit the present disclosure. Any person skilled in the art to which the present disclosure pertains may make any modification and variation to forms and details of implementations without departing from the spirit and scope disclosed in the present disclosure. However, the patent protection scope of the present disclosure is still subject to the scope defined by the appended claims.

The invention claimed is:

1. A brightness control apparatus, applied to a display panel, wherein the brightness control apparatus comprises an optical detection circuit and an integrated circuit chip connected with the optical detection circuit, wherein the optical detection circuit comprises at least one transistor, configured to detect a light intensity of light to be detected corresponding to an environment where the display panel is located and generate an electrical signal corresponding to the light intensity of the light to be detected; and the integrated circuit chip is configured to generate a brightness detection value of the light to be detected based on the electrical signal corresponding to the light intensity of the light to be detected, and adjust display brightness of the display panel according to the brightness detection value of the light to be detected;

wherein the optical detection circuit comprises a detection transistor unit and a reference transistor unit, wherein the detection transistor unit comprises at least one first transistor, configured to be illuminated by the light to be detected, detect the light intensity of the light to be detected, and generate a first electrical signal corresponding to the light intensity of the light to be detected; and the reference transistor unit comprises at least one second transistor, configured to be not illuminated by the light to be detected, and generate a second electrical signal corresponding to a light intensity in case of not being illuminated by the light to be detected;

wherein the integrated circuit chip comprises a power supply module, connected with a first terminal of the detection transistor unit, a first terminal of the reference transistor unit, a control terminal of the detection transistor unit, and a control terminal of the reference transistor unit, and configured to provide working voltages to the detection transistor unit and the reference transistor unit; the integrated circuit chip comprises a first pin, the power supply module is connected with the first terminal of the detection transistor unit through the first pin and a first lead-out line, and is connected with the first terminal of the reference transistor unit through the first pin and the first lead-out line.

2. The brightness control apparatus according to claim 1, wherein the integrated circuit chip comprises a first pin, a second pin, and a third pin; the power supply module is connected with the control terminal of the detection transistor unit through the second pin and a second lead-out line; the power supply module is connected with the control terminal of the reference transistor unit through the third pin and a third lead-out line; and the power supply module is configured to provide the working voltages to the detection transistor unit and the reference transistor unit through the first pin, the second pin, and the third pin.

3. The brightness control apparatus according to claim 1, wherein the power supply module is configured to transmit a first square-wave timing signal to the detection transistor unit and the reference transistor unit, wherein each clock cycle of an input signal in the first square-wave timing signal comprises a first time period with a first low-level signal and a second time period with a first high-level signal, and a rising edge of the first high-level signal in the first square-wave timing signal is located before a falling edge of frame synchronization idle time Vporch;

the power supply module is configured to provide and transmit a second square-wave timing signal to the detection transistor unit, wherein each clock cycle of a first control signal in the second square-wave timing signal comprises a first time period with a second low-level signal and a second time period with a second high-level signal, and a rising edge of the second high-level signal in the second square-wave timing signal is located before the falling edge of the frame synchronization idle time Vporch; and the power supply module is configured to provide and transmit a third square-wave timing signal to the reference transistor unit, wherein each clock cycle of a second control signal in the third square-wave timing signal comprises a first time period with a second low-level signal and a second time period with a second high-level signal, and a rising edge of the second high-level signal in the third square-wave timing signal is located before the falling edge of the frame synchronization idle time Vporch.

4. The brightness control apparatus according to claim 1, wherein the integrated circuit chip comprises: a signal collection module connected with the detection transistor unit and the reference transistor unit, and a signal processing module connected with the signal collection signal, wherein the signal collection module is configured to collect the first electrical signal and the second electrical signal, and send the first electrical signal and the second electrical signal to the signal processing module; and the signal processing module is configured to obtain a corresponding electrical signal difference based on the first electrical signal and the second electrical signal, and generate the brightness detection value of the light to be detected based on the electrical signal difference.

5. The brightness control apparatus according to claim 4, wherein the signal processing module is configured to convert the electrical signal difference into the brightness detection value of the light to be detected according to a following relational formula:

$$L = a \times V \times V + b \times V + c$$

wherein L represents the brightness detection value of the light to be detected, V represents the electrical signal difference corresponding to the light intensity of the light to be detected, a is a first coefficient measured in advance, b is a second coefficient measured in advance, and c is a third coefficient measured in advance.

6. The brightness control apparatus according to claim 4, wherein the signal collection module is connected with a second terminal of the detection transistor unit and a second terminal of the reference transistor unit, and is configured to collect the first electrical signal from the second terminal of the detection transistor unit, and collect the second electrical signal from the second terminal of the reference transistor unit.

7. The brightness control apparatus according to claim 6, wherein the integrated circuit chip comprises a fourth pin and a fifth pin; the signal collection module is connected with the second terminal of the detection transistor unit through the fourth pin and a fourth lead-out line; the signal collection module is connected with the second terminal of the reference transistor unit through the fifth pin and a fifth lead-out line; and the signal collection module is configured to collect the first electrical signal through the fourth pin, and collect the second electrical signal through the fifth pin.

8. The brightness control apparatus according to claim 1, wherein the integrated circuit chip comprises a signal processing module, a signal generation module, and a light emitting driving module, wherein the signal processing module is configured to generate the brightness detection value of the light to be detected based on the electrical signal corresponding to the light intensity of the light to be detected, and send the brightness detection value of the light to be detected to the signal generation module;

the signal generation module is configured to generate a corresponding first driving signal based on the brightness detection value of the light to be detected, and send the first driving signal to the light emitting driving module; and the light emitting driving module is configured to control the display brightness of the display panel based on the first driving signal.

9. The brightness control apparatus according to claim 8, wherein the signal generation module is configured to acquire the first driving signal corresponding to the brightness detection value of the light to be detected according to a pre-stored mapping relationship between a brightness value and a driving signal; and/or the integrated circuit chip further comprises a detection module and a control module, wherein the detection module is configured to detect whether there is a signal change occurring to a signal output terminal of an application processor; and the control module is configured to control a connection state between the light emitting driving module and each of the signal generation module and the application processor according to whether there is a signal change occurring to the signal output terminal of the application processor.

10. The brightness control apparatus according to claim 9, wherein the control module is configured to, when the detection module detects that there is a signal change occurring to the signal output terminal of the application processor, turn on a connection between the light emitting driving module and the application processor and disconnect a connection between the light emitting driving module and the signal generation module, and the light emitting driving module is configured to, when the detection module detects that there is a signal change occurring to the signal output terminal of the application processor, receive a second driving signal generated based on a user operation and sent by the application processor and control the display brightness of the display panel based on the second driving signal; or the control module is configured to, when the detection module detects that there is no signal change occurring to the signal output terminal of the application process, turn on a connection between the light emitting driving module and the signal generation module and disconnect a connection between the light emitting driving module and the application processor, and the light emitting driving module is configured to, when the detection module detects that there is no signal change occurring to the signal output terminal of the application processor, receive the first driving signal sent by the signal generation module and control the display brightness of the display panel based on the first driving signal.

11. The brightness control apparatus according to claim 1, wherein the integrated circuit chip comprises a signal processing module and a light emitting driving module, wherein the signal processing module is configured to generate the brightness detection value of the light to be detected based on the electrical signal corresponding to the light intensity of the light to be detected, and send the brightness detection value of the light to be detected to an application processor; and the light emitting driving module is configured to receive a third driving signal generated based on the brightness detection value of the light to be detected and sent by the application processor, and control the display brightness of the display panel based on the third driving signal.

12. The brightness control apparatus according to claim 11, wherein the integrated circuit chip is a Touch and Display Driver Integration chip; the Touch and Display Driver Integration chip comprises a data communication interface, configured to transmit a touch data packet; and the signal processing module is configured to add the brightness detection value of the light to be detected into the touch data packet to obtain a processed touch data packet, and send the processed touch data packet to an application processor through the data communication interface to send the brightness detection value of the light to be detected to the application processor.

13. A display apparatus, comprising a display panel and the brightness control apparatus according to claim 1, wherein the display panel comprises: a display region, and a bonding region and a border region that are located on two opposite sides of the display region in a first direction; and an optical detection circuit in the brightness control apparatus is arranged in the border region, and an integrated circuit chip in the brightness control apparatus is in a bonding connection with the bonding region.

14. The display apparatus according to claim 13, wherein the bonding region comprises a first central region and a timing signal wiring region located on at least one side of the first central region in a second direction, the timing signal wiring region comprises a first lead region, a first boundary close to the first central region in the second direction, and a second boundary opposite to the first boundary, the first lead region is located on at least one of a side of the first boundary close to the second boundary in the timing signal wiring region and a side of the second boundary close to the first boundary in the timing signal wiring region, and the first lead region comprises at least one of a first lead-out line, a second lead-out line, and a third lead-out line, wherein the second direction intersects the first direction;

the integrated circuit chip comprises a first pin, a second pin, and a third pin;

the integrated circuit chip is connected with a first terminal of the detection transistor unit through the first pin and the first lead-out line, and is connected with a first terminal of the reference transistor unit through the first pin and the first lead-out line;

the integrated circuit chip is connected with a control terminal of the detection transistor unit through the second pin and the second lead-out line;

the integrated circuit chip is connected with a control terminal of the reference transistor unit through the third pin and the third lead-out line; and the integrated circuit chip is configured to provide working voltages to the detection transistor unit and the reference transistor unit through the first pin, the second pin, the third pin, the first lead-out line, the second lead-out line, and the third lead-out line.

15. The display apparatus according to claim 14, wherein along the second direction, the bonding region further comprises a touch signal wiring region located between the first central region and the timing signal wiring region in the second direction, wherein the touch signal wiring region comprises a second lead region, a first boundary close to the first central region in the second direction, and a second boundary opposite to the first boundary;

the second lead region is located on a side of the second boundary close to the first boundary in the touch signal wiring region;

the second lead region comprises at least one of a fourth lead-out line and a fifth lead-out line;

the integrated circuit chip comprises a fourth pin and a fifth pin;

the integrated circuit chip is connected with a second terminal of the detection transistor unit through the fourth pin and the fourth lead-out line;

the integrated circuit chip is connected with a second terminal of the reference transistor unit through the fifth pin and the fifth lead-out line; and the integrated circuit chip is configured to collect a first electrical signal through the fourth pin and the fourth lead-out line, and collect a second electrical signal through the fifth pin and the fifth lead-out line.

16. The display apparatus according to claim 15, wherein there are two timing signal wiring regions and two touch signal wiring regions; and/or the display panel further comprises a cutting region arranged on a peripheral side of the bonding region, wherein the cutting region comprises at least one cutting line, and a shape of the at least one cutting line is the same as a contour of the bonding region; the first pin is connected with the first terminal of the detection transistor unit and the first terminal of the reference transistor unit through the first lead-out line in the first lead region on a side of the timing signal wiring region away from the cutting line; the second pin is connected with the control terminal of the detection transistor unit through the second lead-out line in the first lead region on the side of the timing signal wiring region away from the cutting line; and the third pin is connected with the control terminal of the reference transistor unit through the third lead-out line in the first lead region on the side of the timing signal wiring region away from the cutting line.

17. The display apparatus according to claim 13, further comprising a light emitting device, wherein the light emitting device is located on a display side of the display panel, or, the light emitting device is located on a side opposite to the display side of the display panel, or, the light emitting device is located on a peripheral side of the display panel.

18. A brightness control method, applied to the brightness control apparatus according to claim 1, wherein the brightness control method comprises:

detecting a light intensity of light to be detected corresponding to an environment where a display panel is located, and generating an electrical signal corresponding to the light intensity of the light to be detected; and generating a brightness detection value of the light to be detected based on the electrical signal corresponding to the light intensity of the light to be detected, and adjusting display brightness of the display panel according to the brightness detection value of the light to be detected.

* * * * *